June 3, 1969

W. M. GOLDBERGER ET AL  3,448,234

ELECTRICAL RESISTIVITY CONTROL OF FLUIDIZED BEDS

Filed Aug. 31, 1966   Sheet 1 of 2

INVENTORS
WILLIAM M. GOLDBERGER
ALLAN K. REED &
CLOYD A. SNAVELY
BY GRAY MASE & DUNSON
ATTORNEYS

INVENTORS
WILLIAM M. GOLDBEGER
ALLAN K. REED &
CLOYD A. SNAVELY
BY GRAY MASE & DUNSON
ATTORNEYS

# United States Patent Office 3,448,234
Patented June 3, 1969

3,448,234
ELECTRICAL RESISTIVITY CONTROL OF FLUIDIZED BEDS
William M. Goldberger, Allan K. Reed, and Cloyd A. Snavely, Columbus, Ohio, assignors to The Battelle Development Corporation, Columbus, Ohio, a corporation of Delaware
Filed Aug. 31, 1966, Ser. No. 576,328
Int. Cl. H05b 1/00, 3/10
U.S. Cl. 219—50                                         8 Claims

ABSTRACT OF THE DISCLOSURE

A method for altering or controlling the electrical resistivity of a fluidized bed of electrically conductive particles which consists of inducing vibrations into the bed. The resistivity of the bed varies with the amplitude of vibration so that the resistivity can be accurately controlled by controlling the amplitude.

---

This invention relates to an improvement in electrical resistance heating of beds of fluidized particles and relates in particular to a new and novel method for controlling the electrical resistance of a bed of electrically conductive fluidized particles.

A known method for industrial heating is to fluidize a bed of electrically conductive particles and pass an electric current through the bed. The resistance of the bed to the flow of current causes the bed to heat electrothermally because of the $I^2R$ energy conversion much in the manner of a resistance wire heating element. Numerous applications of this type of electrothermal fluidized bed have been described in the literature and are taught in the U.S. Patnets 2,958,584 and 2,921,840, Johnson et al., and in U.S. Patents 3,025,385 and 3,060,304, Yukio Tanaka.

Also, in copending patent application Ser. No. 467,160, filed May 25, 1965, entitbled "Plasma Generator" now Patent No. 3,404,078, dated Oct. 1, 1968, and patent application Ser. No. 389,268, filed Aug. 13, 1964, entitled "Plasma," now abandoned, there are described methods and apparatus for exposing high-temperature reactants to a plasma arc wherein one electrode is an electrically conductive fluidized bed. In this system, the character of the arc and the performance characteristics of the bed are dependent on the electrical resistivity properties of the bed.

Where an electric current is caused to flow through electrically conductive fluidized bed, as the temperature of the bed increases the overall electrical resistance of the bed tends to decrease. In that respect, the electrical behavior of the fluidized solids is similar to that of solids used in the more common resistance heating elements. When extremely high temperatures are desired, for example temperatures in excess of about 2500° F., the electrical resistivity may be lowered to the extent that it becomes impossible to supply sufficient $I^2R$ power conversion without exceeding the current capacity of the available power source and electrical leads. In the case in which the conductive bed is an electrode (in the manner of the aforementioned patent applications) the desired characteristics of the arc and the temperature of the bed are dependent on the resistivity properties of the bed. Thus, accurate control of the reaction and the quenching ability of the bed are dependent on the degree of control exercised over the resistivity properties of the fluidized bed.

In the past it has been necessary to change such process conditions as the electrode submergence in the fluidized bed and/or the fluidizing gas velocity or the size of bed particles to obtain some degree of control over the resistivity characteristics of the bed. Such adjustments are difficult to control and their means of accomplishment are inconvenient and often impossible because of limiting conditions for the chemical behavior of a desired process.

We have now found that contrary to what would be expected, it is possible to raise and/or control the electrical resistivity properties of an electrically conductive fluidized bed of particles by vibrating or pulsating the bed.

In general, the present invention consists of a method for altering or controlling the resistivity properties of an electrically conductive fluidized bed by inducing vibrations into the bed and preselecting amplitudes of vibration that effect desired resistivity properties. A preferred advantageous feature of the present invention is to effect such vibrations by inducing pulsations into the fluidizing gas. A particular advantage of the present invention is the discovery that increased resistivity of an electrically conductive vibrated fluidized bed is directly related to increased amplitude of vibrations.

It is, accordingly, an object of the present invention to provide a means for increasing the electrical resistivity of an electrically conductive fluidized bed by vibrating the bed.

Another object is to vibrate an electrically conductive fluidized bed which is heated by passing an electric current therethrough and controlling the electrical resistivity properties of the bed by varying the amplitude of vibrations.

A still further object of the present invention is to provide a method for controlling the electrical resistivity properties of an electrically conductive fluidized bed by vibrating the bed and preselecting the amplitude of vibration.

Further objects and advantageous features of the present invention will be obvious from the following description and the drawing wherein.

In the process of passing electric currents through an electrically conductive fluidized bed of particles, the current is believed to find many continuous paths through the bed from electrode to electrode because of numerous chains or linkages of the individual particles with one another. Any single chain of particles or current path is believed to exist only momentarily in the fluidized bed. Thus, the denser the fluidized bed, the more linkages are present and the less resistance it will offer to current flow. This is borne out by the fact that a static bed (a fluidized bed of conductive particles after the fluidizing gases have been turned off) is much more conductive or offers less resistance to current flow than when in a fluidized state. This phenomenon is demonstrated by the graph of FIG. 1.

Figure 1:
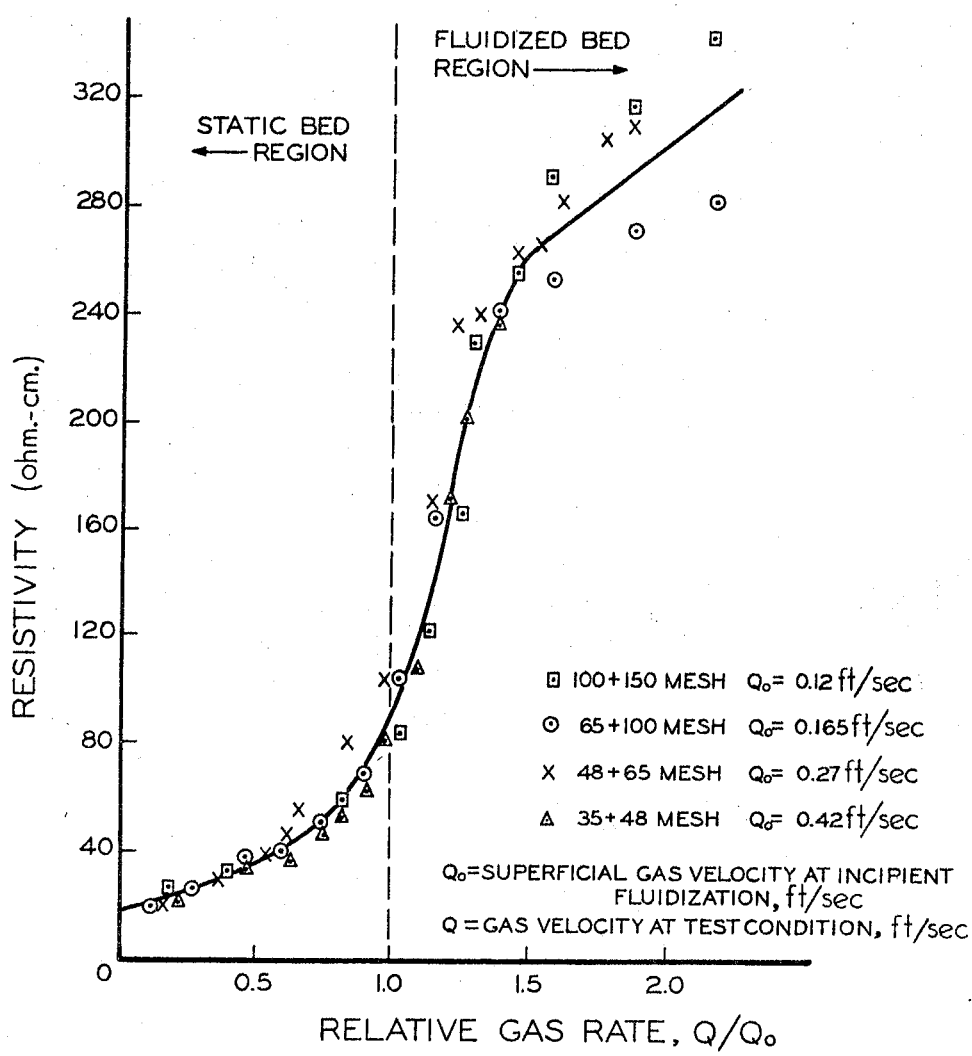
FIG. 1 is a graph showing the relative electrical resistivity properties of static and fluidized graphite particles.
Figure 4:
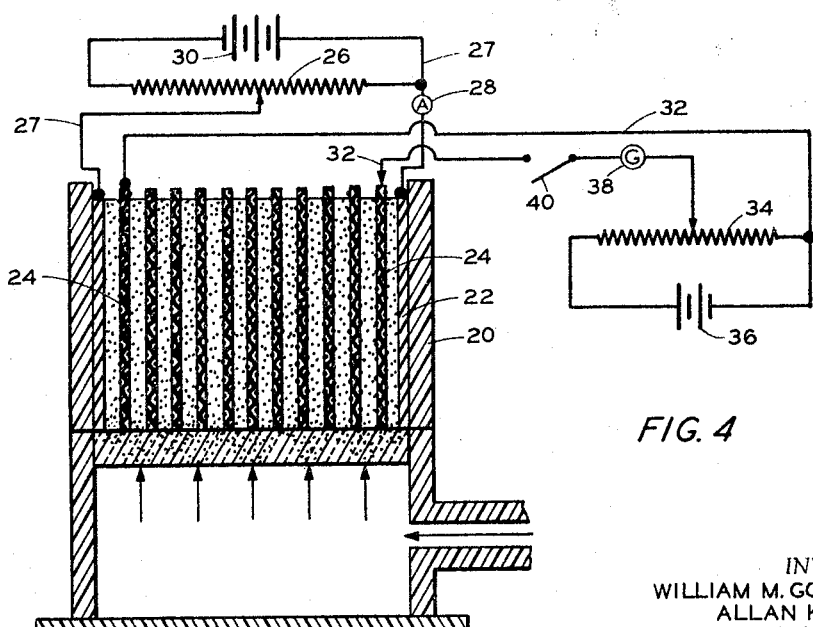
FIG. 4 is an illustrative view partially in cross section showing the apparatus and circuitry utilized to determine the effect of change in amplitude on the resistivity of a conductive vibrated fluidized bed.

To acquire the data represented by the plots of FIG. 1, four separate beds of varying size graphite particles (35–150 mesh) were fluidized in a Plexiglas fluidization vessel of rectangular cross section using argon as the fluidizing gas (see FIG. 4). Use of the rectangular geometry allowed accurate measurement of distance between grids, easier positioning of grids, and provided a constant cross-section area for current flow. The electrodes were rectangular copper plates 2 inches wide and placed 4 inches apart in the bed. Copper screen grids (rectangular) were placed at ½-inch intervals between the electrodes for the purpose of measuring the resistivity of the bed. Current to the bed was supplied by a 22.5–45 volt dry cell battery and controlled with a series rheostat. The gas distributor was a rectangular sintered glass plate with maximum pore size of 4–8 microns.

Since the fluidizing gas rate for effecting corresponding fluidization fo reach sized particle differs, the abscissa of FIG. 1 represents the relative gas rate with 1.0 representing the minimum gas rate which effects some fluidization of each bed. Consequently all of the data to the left of 1.0 represents the resistivity properties (ohm–cm.) of substantially static beds while the plots to the right of 1.0 represent resistivity properties related to fluidized bed.

Figure 2:
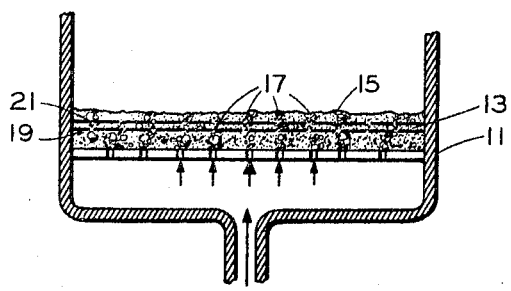
FIG. 2 is an illustrative cross-sectional view of a bed of particles showing the effects of fluidization and fluidization plus vibration.

The significance of the data of FIG. 1 is illustrated by the drawing of FIG. 2, 11 is a fluidized bed chamber and 13 is a fluidized bed of particles. When the bed is static, it reaches a level (depth) illustrated by the line 19. When the bed is fluidized by a gas flow rate that is more than ample to effect fluidization (greater than 1.0 in FIG. 1) void areas or gas bubbles 17 rise through the bed of particles, the level of the bed rises and the surface exhibits a boiling action such as is illustrated at 15.

Thus, it appears from the data of FIG. 1 and the drawing of FIG. 2 that electrically conductive fluidized beds of higher velocity, greater expansion and void fraction exhibit greater resistance to electric current flow than less expanded fluidized beds which exhibit smaller void fractions.

It is known that vibration or pulsation of fluidized solids can effect more even distribution of the fluidizing gas resulting in a lesser void fraction at a given flow condition which tends to minimize the coalescence of the fluidizing gas into large bubbles such as those shown at 17. Consequently, vibration and pulsation of a fluidized bed tends to lower the level of the bed and even out its surface turbulance so that the depth of the bed can be intermediate fluidization without vibration (15 in FIG. 2) and static (17 in FIG. 2) and is represented by the dotted line 21 of FIG. 2. Since the denser static bed is shown by FIG. 1 to have less resistance to electric current flow than the fluidized bed, the denser more uniformly fluidized vibrated bed would be expected to exhibit less electrical resistivity than a fluidized bed that is not vibrated.

Figure 3:
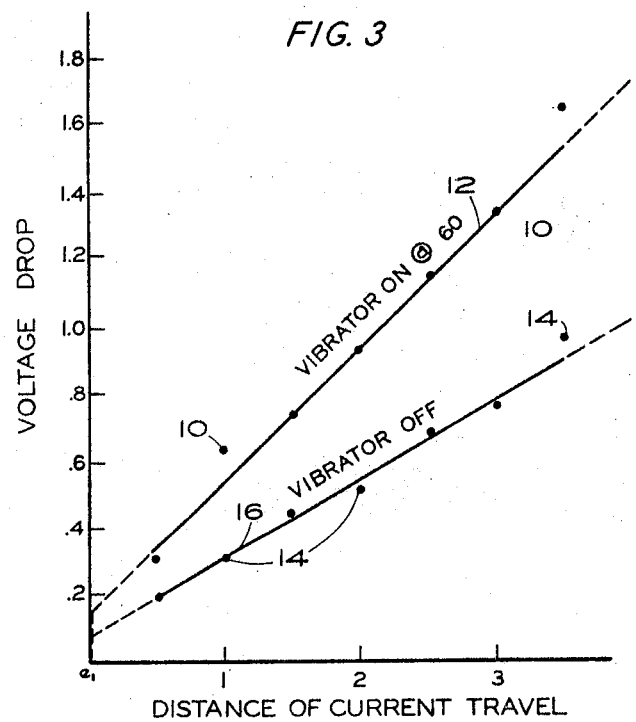
FIG. 3 is a graph showing the resistivity properties of a vibrated electrically conductive fluidized bed as compared to the same bed fluidized but not vibrated.

However, as shown by FIG. 3, the reverse appears to be true. While vibration makes the gas distribution more uniform and the fluidization more homogeneous, the electrical resistance increases when the bed is vibrated. The increase in resistivity appears to be related to reduction in the number of continuous chains of particles or the particle-to-particle "linkages."

The data of FIG. 3 was established by the utilization of the apparatus described in conjunction with the data of FIG. 1 (see also FIG. 4). The graphite bed consisted of −48, +65 mesh particles. The fluidizing gas was argon and the flow rate was 0.3 ft./sec. The bed itself consisted of 250 grams of graphite and was two inches deep on fluidization. Current flow was 10 milliamperes of direct current. Plots 10 and curve 12 were determined while vibrating the bed (60 cycles per second) while the plots 14 and curve 16 were determined after the vibrations had been turned off.

The resulting plots set forth in FIG. 3 clearly show less voltage drop per unit of distance of current flow for the vibrated bed as compared to the bed after the vibrator has been turned off. Thus, it is clear that vibration of a conductive fluidized bed during current flow raises the resistivity properties of the bed.

Table I, below, shows that where an electric current is caused to flow through an electrically conductive fluidized bed, as the temperature of the bed increases the overall electrical resistance of the bed tends to decrease, particularly at very high temperatures such as those exceeding 2500° C.

The data of Table I was established by the utilization of a cylindrical (7½" O.D. 6" I.D.) graphite fluidization chamber. The chamber wall was constructed of graphite and constituted one electrode while a centrally suspended 1½" cylindrical graphite rod constituted the other electrode. A porous graphite gas distributor plate was utilized to fluidize a bed of −20, +100 mesh graphite particles. Argon was utilized as the fluidizing gas. Voltage and amperage measurements were taken while varying the temperature of the bed. The results were as follows:

TABLE I

| Temp., °F. | Volts | Amps | Resistivity |
| --- | --- | --- | --- |
| 2,500 | 75 | 150 | 0.500 |
| 2,500 | 68 | 200 | 0.345 |
| 3,200 | 65 | 200 | 0.323 |
| 4,200 | 58 | 300 | 0.196 |
| 4,800 | 45 | 470 | 0.090 |

The electrical resistivity properties of a graphite fluidized bed are relatively constant at temperatures below about 2500° F. It is generally true of charge-resistor type furnace operations that at very high temperatures it is often difficult to effect controls of electrical power input because of the change of resistivity with temperature and chemical changes that may be occurring. Therefore, the present method becomes of greater significance at these high temperatures (2500° F. or above) because it enables one to control the resistivity of the fluidized bed independently of other conditions such as gas flow, particle size distribution and bed composition enabling a convenient control of applied power and therefore the operating temperature.

The apparatus depicted by the illustrative drawing of FIG. 4 is that utilized in developing the data of the graphs of FIGS. 1 and 3.

The following description of the device of FIG. 4 includes a further demonstration of the effects of vibration (or fluidizing gas pulsation) on the resistivity of a current carrying fluidized bed.

Graphite particles (−48, +65 mesh) were fluidized in the rectangular chamber 20 (2" x 5" x 4" deep) (see FIG. 4). The fluidizing gas was nitrogen. Rectangular copper electrodes 22 (2" x 2") were positioned at either end of chamber 20 and several rectangular copper grids 24 were evenly spaced between the electrodes. The electrodes 22 were connected to the terminals of a 1380 ohm rheostat 26 through leads 27, the anode connection first passing through an ammeter 28 (0–100 ma.). A 22½ volt dry-cell battery 30 was positioned to provide direct current flow from anode to cathode through the rheostat 26 and ammeter 28. In this manner current flow could be readily regulated. Two leads 32 were utilized to connect the grids 24 to a precision resistor (100 ohms) 34. The leads 32 were connected in a reverse order to the anode connection to the rheostat 26. A 6-volt dry-cell battery 36 was utilized in this circuit and a galvanometer 38 and circuit interrupting switch 40 were placed in the circuit between one grid and the resistance element. With this arrangement, current flow between the electrodes 22 could be regulated, a galvanometer reading could be taken of the resistance offered at the grids.

Additionally the rectangular fluidized bed 20 was caused to vibrate at various amplitudes during the resistance measurements by a Variac vibrator 42. Results of resistance measurements at various grids in the bed at varying amplitudes of vibration are shown below by Table II.

TABLE II

| Position of reading | Millivolts current | Vibrator setting | Reading | Resistance | N² flow rate | Resistivity (ohm-cm) |
|---|---|---|---|---|---|---|
| 1–7 [1] | 10 | 0 | .170 | 102 | 12 | 216 |
| 1–7 | 10 | 30 | .209 | 125.4 | 12 | 266 |
| 1–7 | 10 | 40 | .214 | 128.4 | 12 | 272 |
| 1–7 | 10 | 50 | .253 | 151.8 | 12 | 322 |
| e, –1 [2] | 10 | 0 | .168 | [3] 84 | 12 | |
| e, –1 | 10 | 30 | .170 | [3] 81 | 12 | |
| e, –1 | 10. | 40 | .297 | [3] 157 | 12 | |
| e, –1 | 10 | 50 | .380 | [3] 203 | 12 | |

[1] Measurements taken between copper grids nearest electrodes (as shown by Fig. 4).
[2] Measurements taken between electrode (anode) and adjacent grid.
[3] Net electrode resistance.

The measurements taken at grids 24 (outermost grids equispaced about ½″ in from each electrode) indicate the increased resistivity (216 to 322 ohms/cm.) of the bed for increased amplitude of vibration (readings of from 0–50). The resistance at one electrode (22) in contact with the bed and its adjacent grid 24 (½″ spaced) is also shown to increase with vibration amplitude. This change is given as the net resistance, changing from 84 ohms to 203 ohms with increased vibration.

From the above data, it is quite apparent that the resistivity of an electrically conductive fluidized bed is directly related to the amplitude of vibration and increases with increased amplitude.

In the method of the present invention vibrations may be imposed on the fluidized bed chamber by any convenient means. We have had particular success in vibrating our test apparatus with a Syntron Electric Vibrator, Type V–4 attached to the fluidization vessel. The amplitude of vibration was controlled by controlling the voltage applied to the vibrator via a variable autotransformer. Although, any controlled degree of poistive vibration of the fluidized bed is beneficial in raising or controlling the electrical resistivity properties of an electrically conductive fluidized bed, practical considerations of available equipment would dictate vibrations of from about 10 cycles to 100 cycles/second.

Mechanical vibrations such as the Syntron Electric Vibrator we employ would not be satisfactory for large industrial apparatus and accordingly vibration or more accurately pulsation of the fluidized gas is a preferred mode of operating.

It will be understood that although the specific examples set forth in the present application relate to the direct current resistivity, the principles of this invention are equally applicable to resistance to alternating current since resistivity of any component is equal in either direction.

It is also understood that the specific examples set forth in no way limit the claims to the exact embodiments set forth.

What is claimed is:

1. The method of increasing the electrical resistivity of a current carrying fluidized bed of particles comprising the step of superimposing vibrations to the fluidized particles over the vibrations that normally accompany fluidization while conducting said electric current therethrough.

2. The method of claim 1 wherein the electric current is flowing between two electrodes in contact with said fluidized bed of particles.

3. The method of claim 1 wherein said bed is one electrode of a plasma arc system.

4. The method of increasing the electrical resistivity properties of a bed of current carrying particles that are subjected to fluidization by gaseous updrafts and vibration comprising increasing the amplitude of vibrations.

5. The method of claim 4 wherein said electrical currents flow between electrodes in contact with said fluidized bed.

6. The method of claim 5 wherein said fluidized bed of particles is one electrode in a plasma arc system.

7. The method of claim 4 whereby said vibrations are effected by pulsating said fluidizing gas.

8. The method of controlling the electrical resistivity properties of an electrical current carrying fluidized bed of particles at temperatures in excess of 2500° F. comprising:

(a) subjecting said fluidized bed to superimposed vibrations; and
(b) varying the amplitude of said vibrations upwardly to raise said resistivity and downwardly to lower said resistivity.

References Cited

UNITED STATES PATENTS

| 3,025,385 | 3/1962 | Tanaka | 219—50 |
| 3,060,304 | 10/1962 | Tanaka | 219—50 |
| 3,136,836 | 6/1964 | Tanaka | 219—50 |
| 3,157,468 | 11/1964 | Kennedy et al. | 23—151 |
| 3,137,781 | 6/1964 | Tanaka | 219—50 |
| 3,170,763 | 2/1965 | Reid et al. | 23—206 |
| 3,305,661 | 2/1967 | Shine et al. | 219—50 |

FOREIGN PATENTS 568,220  12/1958  Canada.

OTHER REFERENCES

"Effects of Agitation on Gas Fluidization of Solids," T. M. Reed and M. R. Fenske, Industrial & Engineering Chemistry, pp. 275–282, February 1955.

RICHARD M. WOOD, *Primary Examiner.*

B. A. STEIN, *Assistant Examiner.*

U.S. Cl. X.R.

23—1; 219—121